US011785092B2

(12) United States Patent
Li et al.

(10) Patent No.: US 11,785,092 B2
(45) Date of Patent: Oct. 10, 2023

(54) MULTIMEDIA RESOURCE PLAYING METHOD, APPARATUS, TERMINAL, AND SYSTEM

(71) Applicant: Petal Cloud Technology Co., Ltd., Dongguan (CN)

(72) Inventors: Nian Li, Shenzhen (CN); Yuepeng Li, Shanghai (CN)

(73) Assignee: PETAL CLOUD TECHNOLOGY CO., LTD., Dongguan (CN)

( * ) Notice: Subject to any disclaimer, the term of this patent is extended or adjusted under 35 U.S.C. 154(b) by 171 days.

(21) Appl. No.: 17/603,084

(22) PCT Filed: Apr. 7, 2020

(86) PCT No.: PCT/CN2020/083481
§ 371 (c)(1),
(2) Date: Oct. 12, 2021

(87) PCT Pub. No.: WO2020/207373
PCT Pub. Date: Oct. 15, 2020

(65) Prior Publication Data
US 2022/0191287 A1    Jun. 16, 2022

(30) Foreign Application Priority Data

Apr. 12, 2019 (CN) .......................... 201910294486.7

(51) Int. Cl.
| H04L 67/14 | (2022.01) |
| H04N 21/41 | (2011.01) |
| H04N 21/439 | (2011.01) |
| H04N 21/458 | (2011.01) |

(52) U.S. Cl.
CPC .......... *H04L 67/14* (2013.01); *H04N 21/4108* (2013.01); *H04N 21/4394* (2013.01); *H04N 21/458* (2013.01)

(58) Field of Classification Search
None
See application file for complete search history.

(56) References Cited

U.S. PATENT DOCUMENTS

| 9,858,346 | B2 * | 1/2018 | Anguiano ........... G06F 16/9537 |
| 10,839,795 | B2 * | 11/2020 | Torok ...................... G06F 3/167 |
| 2004/0107169 | A1 | 6/2004 | Lowe | |
| 2015/0128194 | A1 | 5/2015 | Kuang et al. | |

(Continued)

FOREIGN PATENT DOCUMENTS

| CN | 101009578 A | 8/2007 |
| CN | 102543119 A | 7/2012 |

(Continued)

*Primary Examiner* — Quang N Nguyen
(74) *Attorney, Agent, or Firm* — Conley Rose, P.C.

(57) ABSTRACT

A multimedia playing method includes obtaining, by a terminal, an identifier of a playback device, determining, by the terminal, a multimedia resource category based on a correspondence between the identifier and the multimedia resource category, playing, by the terminal via the playback device, a multimedia resource corresponding to the category. When the terminal is connected to different playback devices, the terminal may play multimedia resources of different categories via the playback devices based on identifiers of the playback devices, to implement an intelligent service of the terminal.

19 Claims, 5 Drawing Sheets

(56) References Cited

U.S. PATENT DOCUMENTS

| | | | |
|---|---|---|---|
| 2018/0139512 A1 | 5/2018 | Moran et al. | |
| 2019/0097867 A1 | 3/2019 | Qiu | |
| 2020/0004397 A1 | 1/2020 | Zhang et al. | |
| 2020/0201877 A1* | 6/2020 | Zou | G06F 16/906 |

FOREIGN PATENT DOCUMENTS

| | | |
|---|---|---|
| CN | 102833679 A | 12/2012 |
| CN | 103220301 A | 7/2013 |
| CN | 104575539 A | 4/2015 |
| CN | 104750685 A | 7/2015 |
| CN | 104851440 A | 8/2015 |
| CN | 104978164 A | 10/2015 |
| CN | 106371795 A | 2/2017 |
| CN | 106604208 A | 4/2017 |
| CN | 107070701 A | 8/2017 |
| CN | 107222326 A | 9/2017 |
| CN | 104363544 B | 10/2017 |
| CN | 107426064 A | 12/2017 |
| CN | 107948408 A | 4/2018 |
| CN | 108173833 A | 6/2018 |
| CN | 109032725 A | 12/2018 |
| CN | 109446375 A | 3/2019 |
| CN | 110165819 A | 8/2019 |
| WO | 2017162043 A1 | 9/2017 |

* cited by examiner

MULTIMEDIA RESOURCE PLAYING METHOD, APPARATUS, TERMINAL, AND SYSTEM

CROSS-REFERENCE TO RELATED APPLICATIONS

This is a U.S. National Stage of International Patent Application No. PCT/CN2020/083481 filed on Apr. 7, 2020, which claims priority to Chinese Patent Application No. 201910294486.7 filed on Apr. 12, 2019. Both of the aforementioned applications are hereby incorporated by reference in their entireties.

TECHNICAL FIELD

This application relates to the field of multimedia resource processing technologies, and in particular, to a multimedia resource playing method, apparatus, terminal, and system.

BACKGROUND

With continuous development of terminal technologies, more users connect a terminal, for example, a mobile phone or a pad, to an audio playback device in actual work and life, and control, by using the terminal, the audio playback device to play corresponding audio. However, when a user is in a different scenario, the user may expect to hear a different type of music in the different scenario. For example, the user may expect to hear soft music when at home, and may expect to hear dynamic music when driving to work. Therefore, how the terminal automatically plays, via the audio playback device, music the user expects to hear becomes an important problem in providing an intelligent service by the terminal.

SUMMARY

Embodiments of this application provide a multimedia resource playing method, apparatus, terminal, and system, so that a terminal can automatically play a multimedia resource that a user expects to hear or watch.

According to a first aspect, an embodiment of this application provides a multimedia resource playing method. The method includes: A terminal obtains an identifier of a playback device; the terminal determines a multimedia resource category based on a correspondence between the identifier and the multimedia resource category; and the terminal plays, via the playback device, a multimedia resource corresponding to the category. In this implementation, the terminal may determine, based on an identifier of a connected playback device, a category of a multimedia resource to be played via the playback device, and further determine, based on the category, specific multimedia resources to be played via the playback device. Thus, when the terminal is connected to different playback devices, the terminal may play multimedia resources of different categories via the playback devices based on identifiers of the playback devices, to implement automatic playing of a multimedia resource that a user expects to hear or watch, and then implement an intelligent service of the terminal.

With reference to the first aspect, in a first possible implementation of the first aspect, that the terminal determines the multimedia resource category based on the correspondence between the identifier and the multimedia resource category includes: The terminal determines, based on a correspondence between the identifier and a scenario, a scenario in which the playback device is located; and the terminal determines the category based on a correspondence between the scenario and the multimedia resource category. In this implementation, the identifier of the playback device corresponds to the multimedia resource category through a scenario, so that playback devices in different scenarios may correspond to different multimedia resource categories. Therefore, the terminal can play, via the playback devices in the different scenarios, multimedia resources suitable for the scenarios.

With reference to the first implementation of the first aspect, in a second possible implementation of the first aspect, the method further includes: The terminal establishes the correspondence between the identifier and the scenario in response to a scenario input operation on the terminal. In this implementation, the scenario corresponding to the identifier of the playback device may be determined based on a scenario input on the terminal by the user, so that the user can set different scenarios for different playback devices. Therefore, the terminal may play a multimedia resource suitable for the scenario based on the scenario set by the user for the playback device, where the multimedia resource is a multimedia resource in category corresponding to the scenario input by the user.

With reference to the first aspect, in a third possible implementation of the first aspect, the identifier is used to uniquely identify the playback device. In this implementation, the playback device may be uniquely determined based on the identifier of the playback device, so that different playback devices may be determined based on identifiers of the different playback devices.

With reference to the third implementation of the first aspect, in a fourth possible implementation of the first aspect, the identifier of the playback device is specifically any one or more of a media access control address and a product serial number of the playback device. In this implementation, the playback device may be uniquely identified with the MAC address and/or the SN of the playback device.

With reference to the first aspect, in a fifth possible implementation of the first aspect, a first identifier is used to represent a type of the playback device. In this implementation, the type of the playback device may be determined based on the identifier of the playback device, so that different types of the playback devices may be determined based on the identifiers of the different playback devices.

With reference to the first aspect, in a sixth possible implementation of the first aspect, that the terminal determines the multimedia resource category based on the correspondence between the identifier and the multimedia resource category includes: The terminal determines, based on a correspondence between the identifier, a multimedia resource category affecting factor, and the multimedia resource category, a category corresponding to the identifier and the category affecting factor, where the category affecting factor includes any one or more of time, a location of the terminal, weather, and an environment. In this implementation, in an actual application, factors such as the time, the location of the terminal, the weather, and the environment may affect a multimedia resource category that the user expects to hear or watch. Therefore, when the terminal determines the multimedia resource category, the category is determined with reference to both the category affecting factor and the identifier of the playback device, so that a multimedia resource finally played by the terminal can more closely meet a user expectation. This improves user experience.

With reference to the first aspect, in a seventh possible implementation of the first aspect, the method further includes: When the terminal determines to disconnect from the playback device, the terminal records an identifier of the multimedia resource and playing progress of the multimedia resource. In this implementation, the terminal records the identifier of the multimedia resource and the current playing progress, to facilitate a subsequent query.

With reference to the seventh implementation of the first aspect, in an eighth possible implementation of the first aspect, the method further includes: When the terminal determines to reconnect to the playback device, the terminal queries the playing progress of the multimedia resource based on the identifier of the multimedia resource, and resumes playing the multimedia resource via the playback device based on the playing progress of the multimedia resource. In this implementation, the terminal records the identifier of the multimedia resource and the playing progress of the multimedia resource when the terminal is connected to the playback device last time. Therefore, after the terminal is reconnected to the playback device, the terminal may query the playing progress of the multimedia resource based on the record, so that the terminal can resume playing the multimedia resource from a halt point based on the playing progress.

With reference to the first aspect, in a ninth possible implementation of the first aspect, the method further includes: The terminal updates the multimedia resource corresponding to the category. In this implementation, the terminal may update a multimedia resource corresponding to one category. For example, after the playback device plays all multimedia resources in the category, the multimedia resource corresponding to the category may be updated, so that the terminal can play a new multimedia resource. Alternatively, the terminal may periodically update the multimedia resource corresponding to the category, so that the terminal may play a different multimedia resource for the user each time.

With reference to the first aspect, in a tenth possible implementation of the first aspect, that the terminal obtains the identifier of the playback device includes: The terminal obtains the identifier of the playback device based on a digital signal provided by a conversion device, where the conversion device is separately connected to the terminal and the playback device. In this implementation, if the terminal cannot directly identify the playback device, a connection may be established between the terminal and the playback device by using the conversion device, and the identifier of the playback device is provided for the terminal. In this way, the terminal may be connected to more playback devices based on the conversion device. Therefore, a technical solution in this embodiment of this application is applicable to more playback devices.

With reference to any one of the first aspect to the tenth implementation of the first aspect, in an eleventh possible implementation of the first aspect, that the terminal plays, via the playback device, the multimedia resource corresponding to the category includes: The terminal reads the multimedia resource corresponding to the category from a locally stored multimedia resource library; and the terminal plays the multimedia resource via the playback device. In this implementation, the terminal may locally store multimedia resources of one or more categories to form the multimedia resource library. Therefore, each time after determining a category of a multimedia resource to be played, the terminal may obtain, from the locally stored multimedia resource library, the multimedia resource corresponding to the category.

With reference to any one of the first aspect to the tenth implementation of the first aspect, in a twelfth possible implementation of the first aspect, that the terminal plays, via the playback device, the multimedia resource corresponding to the category includes: The terminal downloads the multimedia resource corresponding to the category from a server; and the terminal plays the multimedia resource via the playback device. In this implementation, after determining a category of a multimedia resource to be played, the terminal may download the multimedia resource of the category from a server. In this way, the terminal does not need to prestore a large number of multimedia resources. Therefore, less terminal storage space is occupied.

According to a second aspect, an embodiment of this application further provides a multimedia resource playing apparatus. The apparatus includes: an obtaining module, configured to obtain an identifier of a playback device; a determining module, configured to determine a multimedia resource category based on a correspondence between the identifier and the multimedia resource category; and a playing module, configured to play, via the playback device, a multimedia resource corresponding to the category.

With reference to the second aspect, in a first possible implementation of the second aspect, the determining module includes: a first determining unit, configured to determine, based on a correspondence between the identifier and a scenario, a scenario in which the playback device is located; and a second determining unit, configured to determine the category based on a correspondence between the scenario and the multimedia resource category.

With reference to the first implementation of the second aspect, in a second possible implementation of the second aspect, the apparatus further includes: an establishing module, configured to establish the correspondence between the identifier and the scenario in response to a scenario input operation on the terminal.

With reference to the second aspect, in a third possible implementation of the second aspect, the identifier is used to uniquely identify the playback device.

With reference to the third implementation of the second aspect, in a fourth possible implementation of the second aspect, the identifier of the playback device is specifically any one or more of a media access control address and a product serial number of the playback device.

With reference to the second aspect, in a fifth possible implementation of the second aspect, a first identifier is used to represent a type of the playback device.

With reference to the second aspect, in a sixth possible implementation of the second aspect, the determining module is specifically configured to determine, based on a correspondence between the identifier, a multimedia resource category affecting factor, and the multimedia resource category, a category corresponding to the identifier and the category affecting factor. The category affecting factor includes any one or more of time, a location of the terminal, weather, and an environment.

With reference to the second aspect, in a seventh possible implementation of the second aspect, the apparatus further includes: a recording module, configured to record an identifier of the multimedia resource and playing progress of the multimedia resource when the terminal determines to disconnect from the playback device.

With reference to the seventh implementation of the second aspect, in an eighth possible implementation of the second aspect, the apparatus further includes: a query module, configured to query the playing progress of the multimedia resource based on the identifier of the multimedia resource when the terminal determines to reconnect to the playback device; and a resuming module, configured to resume playing the multimedia resource via the playback device based on the playing progress of the multimedia resource.

With reference to the second aspect, in a ninth possible implementation of the second aspect, the apparatus further includes: an updating module, configured to update the multimedia resource corresponding to the category.

With reference to the second aspect, in a tenth possible implementation of the second aspect, the obtaining module is specifically configured to obtain the identifier of the playback device based on a digital signal provided by a conversion device. The conversion device is separately connected to the terminal and the playback device.

With reference to any one of the second aspect to the tenth implementation of the second aspect, in an eleventh possible implementation of the second aspect, the playing module includes: a reading unit, configured to read the multimedia resource corresponding to the category from a locally stored multimedia resource library; and a first playing unit, configured to play the multimedia resource via the playback device.

With reference to any one of the second aspect to the tenth implementation of the second aspect, in a twelfth possible implementation of the second aspect, the playing module includes: a downloading unit, configured to download the multimedia resource corresponding to the category from a server; and a second playing unit, configured to play the multimedia resource via the playback device.

The multimedia resource playing apparatus provided in the second aspect corresponds to the multimedia resource playing method provided in the first aspect. Therefore, for the various possible implementations of the multimedia resource playing apparatus provided in the second aspect, refer to the various possible implementations of the multimedia resource playing method provided in the first aspect.

According to a third aspect, an embodiment of this application further provides a terminal. The terminal includes a processor and a memory. The memory is configured to store program code, and when the program code is run by the processor, the terminal is enabled to perform the multimedia resource playing method according to the first aspect.

The method performed by the terminal provided in the third aspect corresponds to the multimedia resource playing method provided in the first aspect. Therefore, for various possible implementations of the terminal provided in the third aspect, refer to the various possible implementations of the multimedia resource playing method provided in the first aspect.

According to a fourth aspect, an embodiment of this application further provides a multimedia resource playing system. The system includes a playback device and a terminal. The terminal is configured to perform the multimedia resource playing method according to the first aspect, and the playback device is configured to play a multimedia resource.

The multimedia resource playing system provided in the fourth aspect corresponds to the multimedia resource playing method provided in the first aspect. Therefore, for various possible implementations of the multimedia resource playing system provided in the fourth aspect, refer to the various possible implementations of the multimedia resource playing method provided in the first aspect.

According to a fifth aspect, an embodiment of this application further provides a computer program product including instructions. When the computer program product is run on a computer or a processor, the computer or the processor is enabled to perform the multimedia resource playing method according to the first aspect.

The computer program product including the instructions provided in the fifth aspect corresponds to the multimedia resource playing method provided in the first aspect. Therefore, for various possible implementations of the computer program product including the instructions provided in the fifth aspect, refer to the various possible implementations of the multimedia resource playing method provided in the first aspect.

In the foregoing implementations of the embodiments of this application, the terminal may determine, based on the identifier of the connected playback device, the category of the multimedia resource to be played via the playback device, and further determine, based on the category, specific multimedia resources to be played via the playback device. Thus, when the terminal is connected to different playback devices, the terminal may play multimedia resources of different categories via the playback devices based on identifiers of the playback devices, to implement automatic playing of a multimedia resource that a user expects to hear or watch, and then implement an intelligent service of the terminal.

BRIEF DESCRIPTION OF DRAWINGS

To describe technical solutions in the embodiments of this application more clearly, the following briefly describes the accompanying drawings for describing the embodiments. It is clear that the accompanying drawings in the following description show merely some embodiments of this application, and a person of ordinary skill in the art may derive other drawings from these accompanying drawings.

DESCRIPTION OF EMBODIMENTS

The inventors find through research that, when a user is in a different scenario, a type of music the user expects to hear may be different. Therefore, when a terminal is connected to an audio playback device, how the terminal plays to the user, via the audio playback device, music that is suitable for the scenario in which the user is located becomes an important problem in providing an intelligent service for the user by the terminal.

Based on this, an embodiment of this application provides a multimedia resource playing method. For example, a multimedia resource is audio. The terminal determines, based on an identifier of a playback device connected to the terminal, audio to be played. Specifically, the terminal may obtain the identifier of the playback device, and determine, based on a correspondence between the identifier and an audio category, a category of audio to be played by the terminal, to be specific, determine which category or categories of audio need to be played by the terminal. Further, after determining the category, the terminal may play the audio in the category via the playback device. After the terminal is connected to the playback device, a scenario in which the terminal is located (or a scenario in which a user is located) is usually a scenario in which the playback device is located. Therefore, after the category of the audio is determined based on the identifier of the playback device, the terminal may play music suitable for the scenario, namely, music that the user expects to hear when in the scenario.

It should be noted that the playback device connected to the terminal in this embodiment of this application may be a device for playing audio such as music and Pingshu, or a device capable of playing videos such as a movie and an animation, or a device capable of playing images such as a picture and a photo. That is, in this embodiment of this application, the terminal can play multimedia resources such as music, videos, and pictures based on the identifier of the playback device, and is not merely limited to the music.

Figure 1:
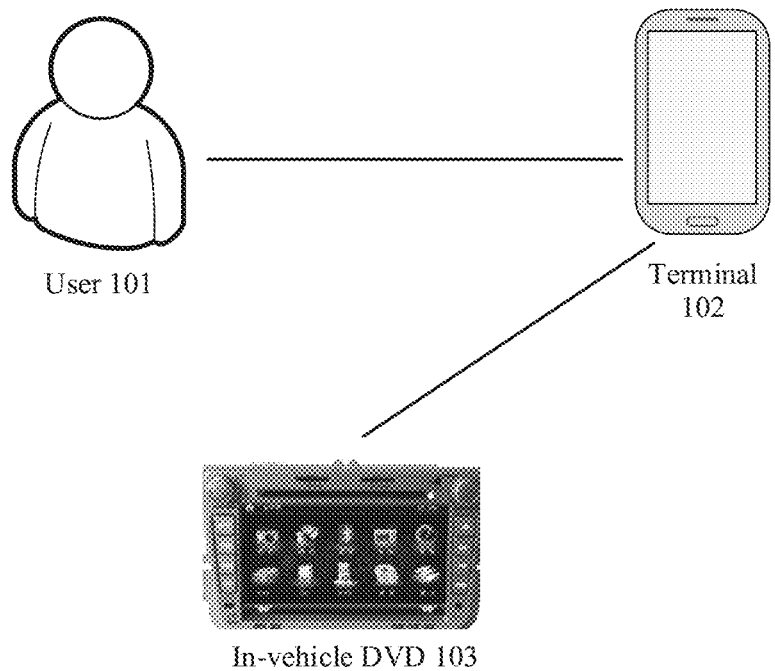
FIG. 1 is a schematic diagram of an example application scenario according to an embodiment of this application.

For example, this embodiment of this application may be applied to an example application scenario shown in FIG. 1. This scenario is a scenario in which a user 101 drives a vehicle. In the scenario, the user 101 triggers a mobile phone 102 to establish a connection to an in-vehicle Digital Versatile Disc (DVD) 103 in the vehicle. The mobile phone 102 may obtain an identifier of the in-vehicle DVD 103, and determine, based on a pre-established correspondence between the identifier and an audio category, a category of audio to be played. Then, the mobile phone 102 may select, from a locally stored music library, audio that belongs to the category, and play the audio to the user 101 via the in-vehicle DVD 103. In this way, the user 101 may hear music that the user expects to hear.

It may be understood that the foregoing scenario is merely a scenario example provided in this embodiment of this application, and this embodiment of this application is not limited to this scenario. For example, another possible scenario may be a bedroom, a study, an office, or the like of a user. A terminal in the scenario may be a mobile phone, a computer, an iPad, or the like. A playback device in the scenario may be a digital TV, a Bluetooth speaker, or the like. In conclusion, this embodiment of this application may be applied to various applicable scenarios, and is not limited to the foregoing scenario.

To make the objectives, features, and advantages of this application more apparent and understandable, the following describes various non-limiting implementations m the embodiments of this application with reference to the accompanying drawings by using examples. Clearly, the described embodiments are some but not all of the embodiments of this application. All other embodiments obtained by a person of ordinary skill in the art based on the embodiments of this application without creative efforts shall fall within the protection scope of this application.

Figure 2:
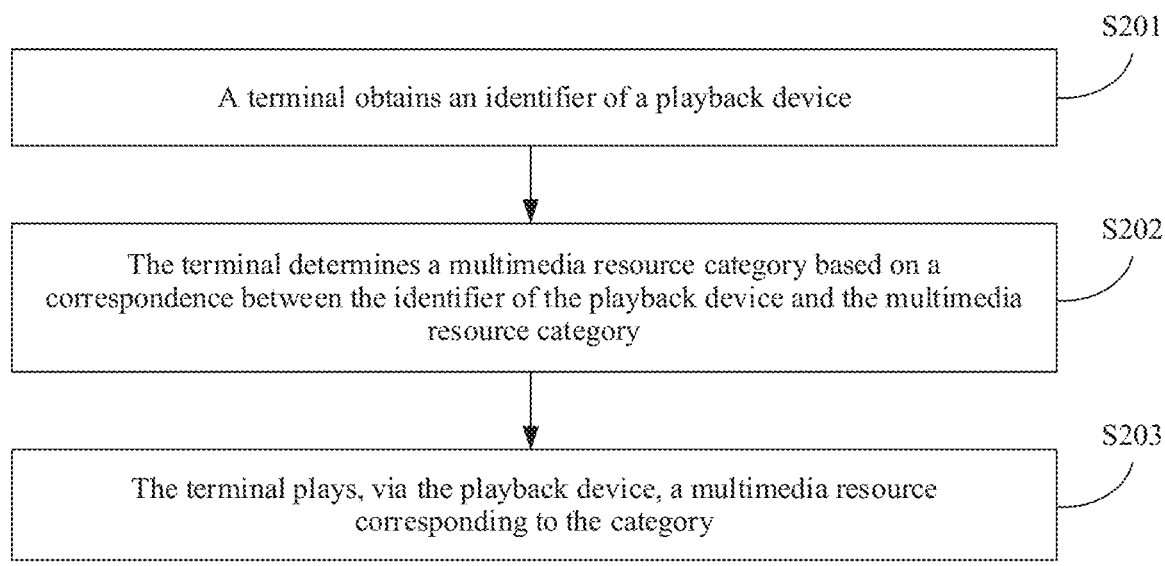
FIG. 2 is a schematic flowchart of a multimedia resource playing method according to an embodiment of this application.

Refer to FIG. 2. FIG. 2 is a schematic flowchart of a multimedia resource playing method according to an embodiment of this application. The method may specifically include the following steps.

S201: A terminal obtains an identifier of a playback device.

In this embodiment, a user may trigger the terminal to establish a connection to the playback device, and the terminal obtains the identifier of the playback device based on the connection to the playback device. In an example specific implementation of obtaining the identifier, when the terminal establishes the connection to the playback device, the playback device may send a connection request to the terminal, to request to establish a communication connection to the terminal, where the connection request carries the identifier of the playback device. The terminal may parse the received connection request to obtain the identifier of the playback device, and return a connection confirmation message to the playback device, to establish the connection to the playback device.

Certainly, in another possible implementation of obtaining the identifier, after the terminal successfully establishes the communication connection to the playback device, the terminal sends an identifier obtaining request to the playback device, to actively obtain the identifier of the playback device from the playback device.

The terminal and the playback device may be wirelessly or wiredly connected. In some examples, when wirelessly connected, the terminal and the playback device may specifically establish the communication connection by using Bluetooth. Correspondingly, the playback device may have a Bluetooth communications module, for example, a Bluetooth speaker. Alternatively, the terminal and the playback device may establish the communication connection by using a wireless network, for example, Wi-Fi. Correspondingly, the playback device may have a wireless network communications module, for example, a Wi-Fi speaker or a smart TV. When connected wiredly, the terminal and the playback device may be specifically connected by using a Universal Serial Bus (USB) cable or a High-Definition Multimedia Interface (HDMI) cable. Correspondingly, the playback device may have a USB interface or an HDMI interface, for example, a digital headphone amplifier or a DVD player.

It should be noted that the identifier of the playback device may be used to uniquely identify the playback device. In an example, the identifier of the playback device may be specifically a media access control (MAC) of the playback device and/or a product serial number (serial number, SN), or the like.

It should be noted that, when the terminal is connected to the playback device by using an interface that cannot directly identify the playback device, the terminal may establish a connection to the playback device by using a conversion device, and obtain the identifier of the playback device based on a digital signal provided by the conversion device. For example, the terminal may use a serial number provided by the conversion device as the identifier of the playback device, or the like. For example, a mobile phone plays audio. A speaker only has an audio interface, and the speaker cannot be directly identified by using a USB interface of the mobile phone. In this case, a conversion device for "converting USB data into audio data" may be added between the mobile phone and the speaker. In this way, the mobile phone is connected to the conversion device by using the USB interface, the conversion device is connected to the speaker by using the audio interface, and then, the mobile phone may use a serial number provided by the conversion device as an identifier of the speaker.

In another possible implementation, the identifier of the playback device may also be used to represent a type of the playback device. Specifically, in some actual application scenarios, the user may play different multimedia resources by using different types of playback devices. For example, the user may play a movie by using a home theater sound system in a living room, play Pingshu by using a mini speaker in a bedroom, and play music by using an in-vehicle DVD in a car. Therefore, in an actual application, the terminal may also obtain type information of the playback device, and use the type of the playback device as the identifier of the playback device.

S202: The terminal determines a multimedia resource category based on a correspondence between the identifier of the playback device and the multimedia resource category.

In this embodiment, categories of multimedia resources may be classified based on a specific classification granularity. For ease of understanding, the following describes classification of the categories of the multimedia resources by using an example.

Figure 3:
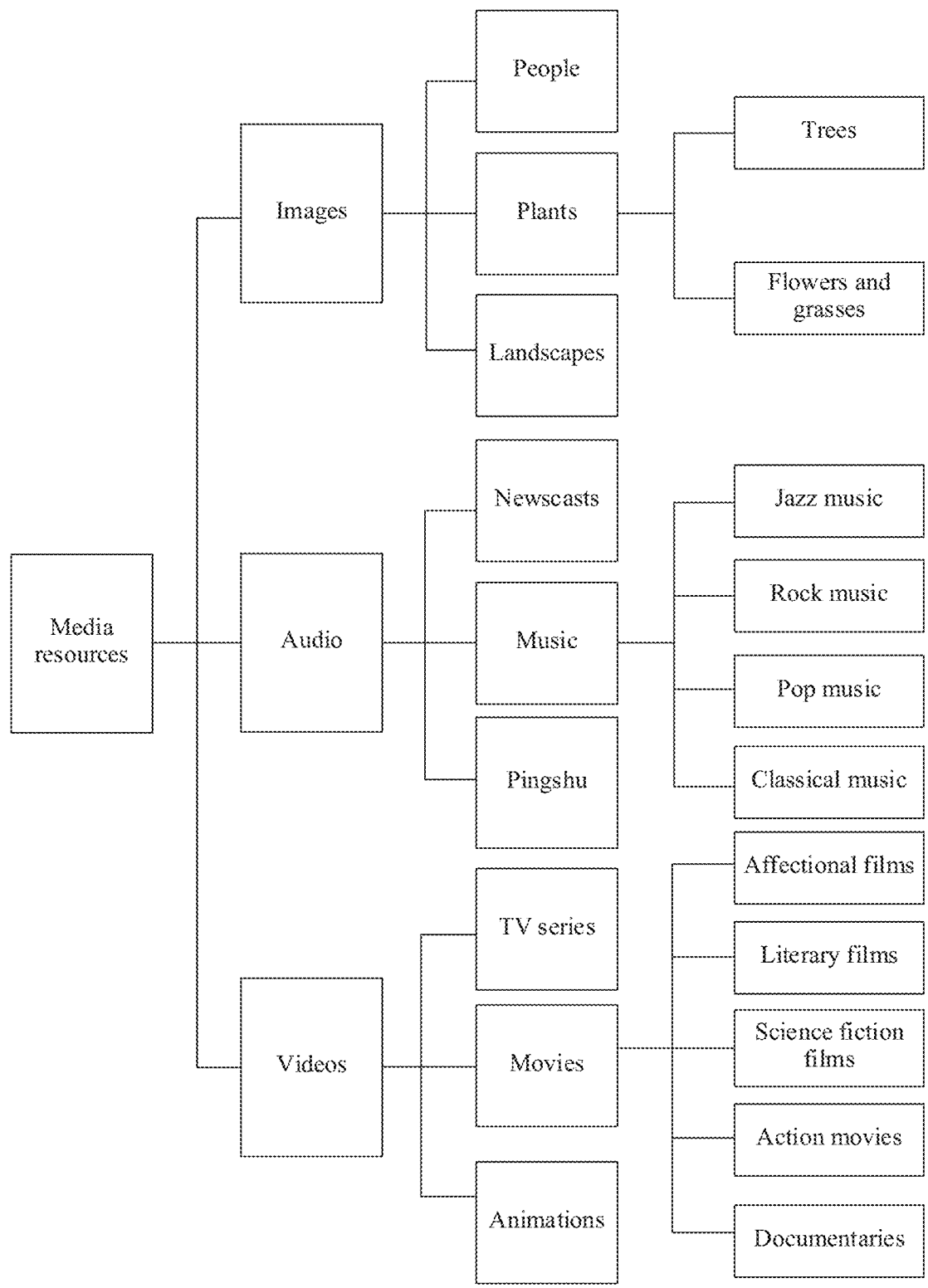
FIG. 3 is a schematic diagram of categories of multimedia resources.

It may be understood that the multimedia resources may be classified into categories such as audio, videos, and images at a coarse granularity, as shown in FIG. 3. The multimedia resources of each category may be further classified. In the example shown in FIG. 3, the audio in the multimedia resources may be further classified into categories such as music, Pingshu, and newscasts. In other words, the categories of the multimedia resources may specifically include the music, the Pingshu, the newscasts, and the like. Further, the music in the audio may be further classified based on types of music. For example, the music may be classified into classical music, pop music, rock music, and jazz music. In this case, the categories of the multimedia resources may specifically include the classical music, the pop music, the rock music, and the jazz music.

Similarly, the videos in the multimedia resources may be further classified into animations, movies, TV series, music videos (MVs), and the like. In this case, the categories of the multimedia resources may specifically include the animations, the movies, the TV series, and the like. Further, the movies in the videos may be further classified based on types of movies. For example, the movies may be classified into documentaries, action movies, science fiction films, literary films, affectional films, and the like. In this case, the categories of the multimedia resources may specifically include the documentaries, the action movies, the science fiction films, the literary films, the affectional films, and the like. The images in the multimedia resources may also be further classified into landscapes, people, plants, and the like. The plants may be further classified into flowers and grasses, trees, and the like. Certainly, the foregoing manner of classifying the multimedia resources is merely used as an example for description, and is not intended to limit the manner of classifying the categories of the multimedia resources in this embodiment. In an actual application, a granularity of category classification and a specific category may be set according to an actual requirement.

In an example specific implementation, the correspondence between the identifier of the playback device and the multimedia resource category may be pre-established on the terminal. For example, a correspondence between a playback device a and a multimedia resource category A can be established, and a correspondence between a playback device b and a multimedia resource category B can be established; or a correspondence between a type I of the playback device and a multimedia resource category I' can be established, and a correspondence between a playback device II and a multimedia resource category II' can be established. In this way, after the terminal obtains the identifier of the playback device (used to identify the playback device or the type of the playback device), the terminal may determine, based on the pre-established correspondence, which category or categories of the multimedia resources need to be played.

It should be noted that there may be one or more multimedia resource categories determined by the terminal. Specifically, when there is a correspondence between the identifier of the playback device and a plurality of multimedia resource categories, the terminal may determine the plurality of multimedia resource categories based on the obtained identifier of the playback device. For example, in an actual application, the user may like to listen to both classical music and jazz music. In this case, the terminal may determine two categories, namely, the classical music and the jazz music, based on the identifier of the playback device. Correspondingly, the user can accept the terminal to display a multimedia resource in any of the two categories.

It should be noted that, in this embodiment, the identifier of the playback device may directly correspond to the multimedia resource category. To be specific, the multimedia resource category may be directly determined based on the identifier of the playback device. However, in some possible implementations, the identifier of the playback device may alternatively correspond to the multimedia resource category based on a scenario. Specifically, a correspondence between the identifier of the playback device and the scenario and a correspondence between the scenario and the multimedia resource category may be pre-established. In this way, after obtaining the identifier of the playback device, the terminal may determine, based on the pre-established correspondence between the identifier of the playback device and the scenario, a scenario in which the playback device is located, and may further determine, based on the correspondence between the scenario and the multimedia resource category, which category or categories of the multimedia resources need to be played by the terminal in the scenario. In this way, when the terminal is connected to playback devices in different scenarios, the terminal may control the playback devices to play multimedia resources suitable for the scenarios based on identifiers of the playback devices in the different scenarios, to implement automatic playing of a multimedia resource that the user expects to hear or watch and then implement an intelligent service of the terminal.

Generally, the scenario in the foregoing implementation may be usually the scenario in which the playback device is located. For example, when the playback device is located in a vehicle of the user, the scenario in which the playback device is located may be the "vehicle"; when the playback device is located in an office of the user, the scenario may be the "office"; when the playback device is located in a bedroom of a home of the user, the scenario may be the "bedroom"; or when the playback device is located in a "bathroom" of the home of the user, the scenario may be the "bathroom".

Further, the scenario in which the playback device is located may be determined based on a scenario input operation of the user. For example, when the playback device establishes the communication connection to the terminal for the first time, the terminal may prompt, on a display screen, the user to input the scenario in which the playback device is located. For example, the terminal may present a prompt dialog box of "Please input a scenario", or present options of a plurality of scenarios and a prompt dialog box of "Please select a scenario". After the user performs the scenario input operation on the terminal, the terminal may establish, in response to the scenario input operation, a correspondence between the identifier of the playback device and the scenario input by the user. In this way, when the terminal is reconnected to the playback device, the terminal may determine, based on the established correspondence, a scenario corresponding to the identifier of the playback device, and may further determine a multimedia resource category corresponding to the identifier of the playback device.

In this embodiment, the terminal may further adjust the established correspondence between the scenario and the multimedia resource category. For example, in an actual application, the user may have a requirement of adjusting the multimedia resource category corresponding to the playback device a. In this case, the terminal may adjust, based on an operation performed by the user on the terminal, the multimedia resource category corresponding to the playback device a from the category A to the category B, so that after the terminal subsequently establishes a connection to the playback device a, the terminal can play a multimedia resource that belongs to the category B.

In another implementation of determining the multimedia resource category, the terminal may further determine the multimedia resource category based on both the identifier of the playback device and a multimedia resource category affecting factor. Specifically, the terminal may pre-establish a correspondence between the identifier of the playback device, the multimedia resource category affecting factor, and the multimedia resource category. Then, while obtaining the identifier of the playback device, the terminal may further obtain the multimedia resource category affecting factor, and determine, based on the foregoing correspondence, a multimedia resource category corresponding to the identifier of the playback device and the category affecting factor. The multimedia resource category affecting factor specifically includes any one or more of time, a location of the terminal, weather, and an environment.

It may be understood that, in an actual application, the current time, the location of the terminal, the weather, and the environment may all affect the multimedia resource the user expects to hear or watch. Specifically, if the multimedia resource category corresponding to the identifier of the playback device is jazz music, the user may be more inclined to hear a symphony in the jazz music at 8:00 a.m., and may be more inclined to hear a romanza in the jazz music at 20:00 p.m. Similarly, in a driving process of the user, when it is determined, based on a Global Positioning System (GPS) technology, that the terminal is located in a suburb, the user may be more inclined to hear heavy metal music in the rock music, and when it is determined that the terminal is located in an urban area, the user may be more inclined to hear blues rock-style music in the rock music. Similarly, when the weather and the environment are represented as a rainy day, the user may be more inclined to hear sad music in the pop music, and when the weather and the environment are represented as a sunny day, the user may be more inclined to hear cheerful music, and the like in the pop music. In addition, the weather and the environment may also represent an environment, for example, a temperature and humidity, around the playback device. For example, when the weather and the environment are represented as humidity and a low temperature, the user may be more inclined to hear the sad music in the pop music, and when the weather and the environment are represented as dryness and an appropriate temperature, the user may be more inclined to hear the cheerful music in the pop music.

S203: The terminal plays, via the playback device, a multimedia resource corresponding to the category.

In this embodiment, after the terminal determines the multimedia resource category, the terminal may play, via the playback device, the multimedia resource that belongs to the category. The multimedia resource specifically refers to audio data, video data, or image data. In an example specific implementation, the terminal may prestore multimedia resources of a plurality of categories in a local multimedia resource library. After the terminal determines the multimedia resource category, the terminal may select, from the locally stored multimedia resource library, multimedia resources that belong to the category. Then, the terminal reads these selected multimedia resources and plays these multimedia resources via the playback device. In other possible implementations, after the terminal determines the multimedia resource category, the terminal may send a request for obtaining a multimedia resource to a server, where the request carries the multimedia resource category. After the server successfully responds to the request, the terminal may download the multimedia resource corresponding to the category from the server, and play the downloaded multimedia resource via the playback device.

It may be understood that the terminal may play multimedia resources of different categories based on identifiers of different playback devices. In this way, when the user is in a different scenario, the terminal may play, by identifying an identifier of a playback device in the scenario, a multimedia resource suitable for the scenario.

Further, when the terminal determines to disconnect from the playback device, the terminal may record an identifier of the multimedia resource and playing progress of the multimedia resource. For example, the multimedia resource is a movie. When the user controls the terminal to actively disconnect from the playback device, the terminal may record a name of the movie and current playing progress of the movie. If the multimedia resource is a plurality of songs, when disconnecting from the playback device, the terminal may record names of these songs (the names and other related information of the songs may alternatively be used as identifiers of the songs) and playing progress of a plurality of songs. The playing progress may be represented as which songs are not completely played, or which songs are completely played and current playing progress of a song being played.

In this way, when the terminal is reconnected to the playback device, the terminal may query the playing progress of the multimedia resource based on the recorded identifier of the multimedia resource, and resume playing the multimedia resource via the playback device based on the queried playing progress. It may be understood that, when the terminal plays the multimedia resource via the playback device again, the terminal may resume playing, from a halt point based on the recorded playing progress, a multimedia resource not completely played last time, instead of replaying the multimedia resource.

In this embodiment, in a further possible implementation, the terminal may further update multimedia resources corresponding to a category. It may be understood that, after the terminal plays all multimedia resources in the category, the terminal may update the multimedia resources in the category. In this way, the terminal may continue to play an updated multimedia resource via the playback device, so that the user can avoid repeatedly listening to or watching a same multimedia resource. Certainly, in another application scenario, the terminal may further periodically update multimedia resources corresponding to a category. For example, it may be set to update multimedia resources corresponding to a category every 24 hours or every 7 days. In this way, the user may hear or watch different multimedia resources each time, which meets an actual application requirement of the user.

When updating a multimedia resource in a category, the terminal may locally obtain a multimedia resource used for updating, or may obtain the multimedia resource used for updating from a server. Specifically, the terminal may select, based on an identifier of a multimedia resource, a multimedia resource different from an original multimedia resource from the locally stored multimedia resource library. Certainly, a category of the selected multimedia resource is consistent with a category of a previously selected multimedia resource. Then, the terminal uses the new multimedia resource to replace the original multimedia resource, to update the multimedia resource. Similarly, when the terminal obtains the multimedia resource for updating from the server, the terminal may receive a request for obtaining a multimedia resource to the server. The request carries a category of the multimedia resource to be obtained and an identifier of the original multimedia resource in the category. In this way, after the server responds to the request, the terminal may download a new media file that belongs to the category from the server, and replace the original multimedia resource with the new multimedia resource, to update the multimedia resource.

In this embodiment, the terminal may determine, based on the identifier of the playback device connected to the terminal, a category of a multimedia resource to be played via the playback device, and further determine, based on the category, specific multimedia resources to be played via the playback device. Thus, when the terminal is connected to different playback devices, the terminal may play multimedia resources of different categories via the playback devices based on identifiers of the playback devices, to implement automatic playing of a multimedia resource that a user expects to hear or watch, and then implement an intelligent service of the terminal.

Figure 4:
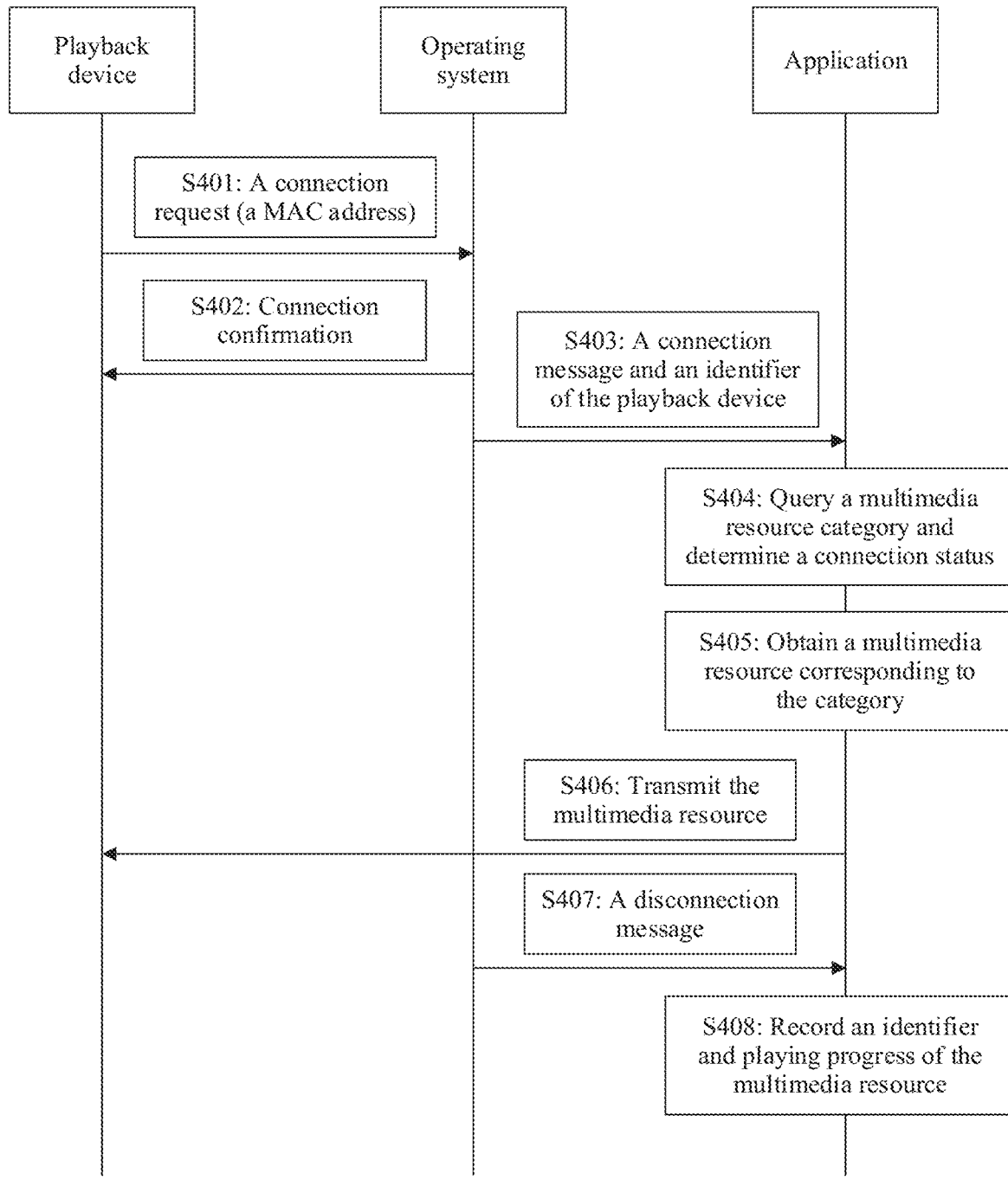
FIG. 4 is a schematic diagram of signaling interaction of a multimedia resource playing method according to an embodiment of this application.

In some implementations of actual application, the terminal may specifically interact with the playback device and play a multimedia resource by using an operating system and an application in the terminal. The following describes the technical solution in this embodiment of this application from a perspective of interaction between the playback device, the operating system in the terminal, and the application in the terminal. Refer to FIG. 4. FIG. 4 is a schematic diagram of signaling interaction of a multimedia resource playing method according to an embodiment of this application. The method may specifically include the following steps.

S401: A playback device sends a connection request to an operating system, where the connection request carries a MAC address of the playback device.

In this embodiment, the MAC address of the playback device may be used as an identifier of the playback device, and the MAC address is carried in the connection request sent by the playback device.

S402: The operating system obtains the MAC address of the playback device by parsing the received connection request, and returns a connection confirmation message to the playback device, to establish a communication connection to the playback device.

Figure 5:
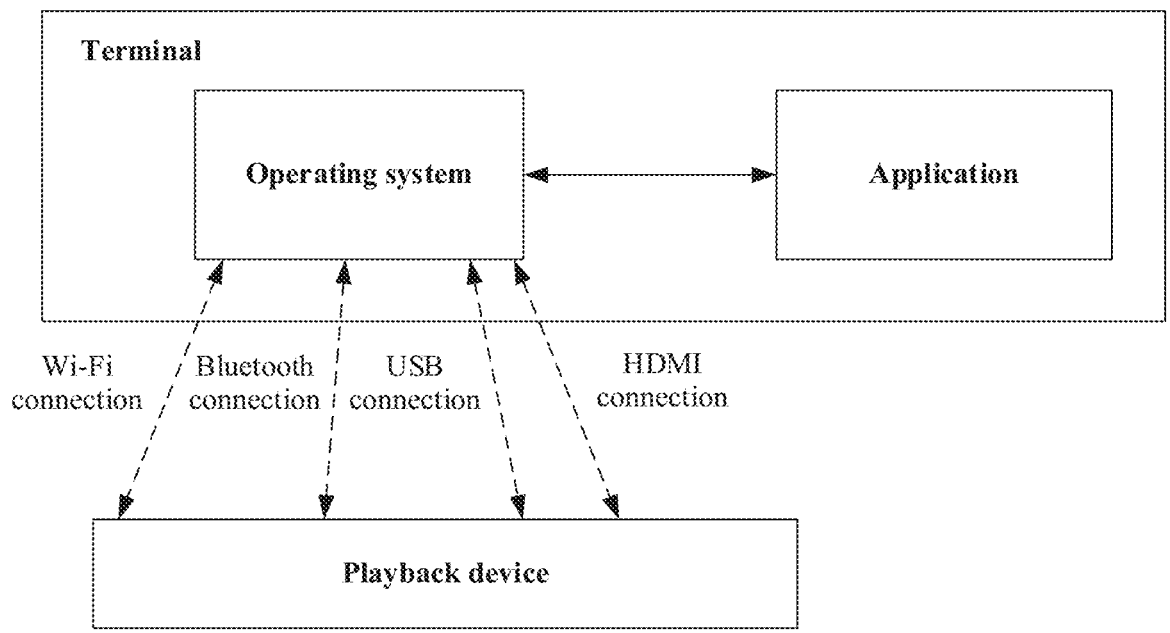
FIG. 5 is a schematic diagram of connections between an operating system and a playback device according to an embodiment of this application.

It should be noted that, in this embodiment, the operating system may establish the communication connection to the playback device by using a communications interface on a terminal. As shown in FIG. 5, the operating system may specifically establish the communication connection to the playback device through any one of a Wi-Fi interface, a Bluetooth interface, a USB interface, and an HDMI interface.

In an example, when the terminal is a mobile phone and the playback device is a home stereo, the mobile phone is connected to the home stereo through USB interfaces. A USB interface of the mobile phone is connected to a USB interface of the home stereo by using a USB OTG (On-The-Go) cable. In addition, the USB interface of the mobile phone works in a host mode of the OTG, and the USB interface of the home stereo works in a device mode. An operating system in the mobile phone enumerates the home stereo, and detects that the home stereo is a sound card. Then, the operating system may load a sound card driver based on a sound card device, and complete installation in the operating system.

S403: The operating system may broadcast a connection message and the identifier of the playback device to an application in the terminal.

In this embodiment, the application in the terminal may be pre-registered in the operating system. After the operating system establishes the communication connection to the playback device through any one of the Wi-Fi interface, the Bluetooth interface, the USB interface, and the HDMI interface, the operating system may broadcast the MAC address of the playback device to the pre-registered application. In addition, the connection message may be broadcast, to notify the application that the communication connection is established between the terminal and the playback device.

S404: The application queries, based on the received MAC address of the playback device, a multimedia resource category corresponding to the MAC address, and determines a connection status between the playback device and the terminal based on the received connection message.

In a specific implementation, the application may receive, by using a broadcast receiver, the MAC address of the playback device and the connection message that are broadcast by the operating system, and determine, by using a device manager based on the connection message, that the playback device and the terminal are in a connected state. Then, in the connected state, the application may query, based on the MAC address, whether a correspondence including the MAC address is locally recorded. If the correspondence is locally recorded, the application determines, based on a pre-recorded correspondence between the MAC address and a scenario, a scenario corresponding to the MAC address, namely, a scenario (for example, a bedroom, a living room, or a vehicle) in which the playback device is currently located. Then, the application determines, based on a pre-stored correspondence between a scenario and a category of a multimedia resource, a category to which a multimedia resource corresponding to the scenario belongs.

S405: The application obtains a multimedia resource corresponding to the category.

In this embodiment, the application may select, from a multimedia resource library locally stored in the terminal, a multimedia resource that falls into the category, and obtain the multimedia resource by reading. However, in another possible implementation, the application may obtain, by downloading from a server, the multimedia resource corresponding to the category.

S406: The application transmits the multimedia resource to the playback device through the established communication connection between the operating system and the playback device, to play the multimedia resource corresponding to the category.

After determining and obtaining the multimedia resource, the application may transmit the multimedia resource to the playback device through the established communication connection, to play the multimedia resource via the playback device.

S407: After detecting that the playback device is disconnected from the operating system, the operating system may broadcast a disconnection message to the application.

In this embodiment, when detecting that the operating system and the playback device are disconnected, the operating system generates the disconnection message, and sends the disconnection message to the application, to notify the application that the established communication connection is disconnected.

S408: The application stops playing the multimedia resource based on the received disconnection message, and records an identifier of the multimedia resource and current playing progress of the multimedia resource.

In this embodiment, the application may receive, by using the broadcast receiver, the disconnection message sent by the operating system, and record the identifier of the multimedia resource in the category and the current playing progress of the multimedia resource after determining, based on the disconnection message, that the communication connection is disconnected. In this way, when the playback device is reconnected to the operating system, the application may resume playing the multimedia resource from a halt point based on the recorded identifier of the multimedia resource and the current playing progress of the multimedia resource.

It should be noted that, in some possible implementations, the operations performed by the application in the foregoing embodiment may be specifically performed by a first application and a second application, where the second application may be multimedia playing software, for example, an audio playing application (APP) or a video playing APP. The first application may query, based on the received identifier (for example, the MAC address) of the playback device, a multimedia resource category corresponding to the identifier, and determines a connection status between the playback device and the operating system based on a received connection message. When determining that the playback device is connected to the terminal, the first application may send the multimedia resource category to the second application, and the second application may obtain a multimedia resource in the category, and send the multimedia resource to the playback device, to play the multimedia resource via the playback device. When the operating system is disconnected from the playback device, the operating system may notify, by broadcasting the disconnection message, the first application that the operating system is disconnected from the playback device. Then, the first application may trigger the second application to record the identifier of the multimedia resource and the current playing progress of the multimedia resource, so that when the playback device is reconnected to the operating system, the second application may resume playing the multimedia resource from the halt point via the playback device based on the recorded identifier of the multimedia resource and the current playing progress of the multimedia resource.

Figure 6:
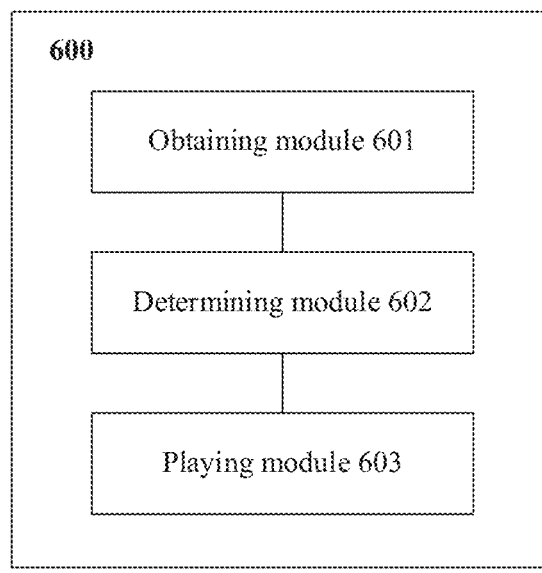
FIG. 6 is a schematic diagram of a structure of a multimedia resource playing apparatus according to an embodiment of this application.

In addition, an embodiment of this application further provides a multimedia resource playing apparatus. Refer to FIG. 6. FIG. 6 is a schematic diagram of a structure of a multimedia resource playing apparatus used in a terminal according to an embodiment of this application. The apparatus 600 includes:

an obtaining module 601, configured to obtain an identifier of a playback device:

a determining module 602, configured to determine a multimedia resource category based on a correspondence between the identifier and the multimedia resource category; and a playing module 603, configured to play a multimedia resource corresponding to the category via the playback device.

In some possible implementations, the determining module 602 includes.

a first determining unit, configured to determine, based on a correspondence between the identifier and a scenario, a scenario in which the playback device is located, and a second determining unit, configured to determine the category based on a correspondence between the scenario and the multimedia resource category.

In some possible implementations, the apparatus 600 further includes:

an establishing module, configured to establish the correspondence between the identifier and the scenario in response to a scenario input operation on the terminal.

In some possible implementations, the identifier is used to uniquely identify the playback device.

In some possible implementations, the identifier of the playback device is specifically any one or more of a media access control address and a product serial number of the playback device.

In some possible implementations, a first identifier is used to represent a type of the playback device.

In some possible implementations, the determining module 602 is specifically configured to determine, based on a correspondence between the identifier, a multimedia resource category affecting factor, and the multimedia resource category, a category corresponding to the identifier and the category affecting factor.

The category affecting factor includes any one or more of time, a location of the terminal, weather, and an environment.

In some possible implementations, the apparatus 600 further includes:

a recording module, configured to record an identifier of the multimedia resource and playing progress of the multimedia resource when the terminal determines to disconnect from the playback device.

In some possible implementations, the apparatus 600 further includes:

a query module, configured to query the playing progress of the multimedia resource based on the identifier of the multimedia resource when the terminal determines to reconnect to the playback device; and a resuming module, configured to resume playing the multimedia resource via the playback device based on the playing progress of the multimedia resource.

In some possible implementations, the apparatus 600 further includes:

an updating module, configured to update the multimedia resource corresponding to the category.

In some possible implementations, the obtaining module 601 is specifically configured to obtain the identifier of the playback device based on a digital signal provided by a conversion device. The conversion device is separately connected to the terminal and the playback device.

In some possible implementations, the playing module 603 includes:

a reading unit, configured to read the multimedia resource corresponding to the category from a locally stored multimedia resource library; and a first playing unit, configured to play the multimedia resource via the playback device.

In some possible implementations, the playing module 603 includes:

a downloading unit, configured to download the multimedia resource corresponding to the category from a server; and a second playing unit, configured to play the multimedia resource via the playback device.

It should be noted that the multimedia resource playing apparatus shown in FIG. 6 is an apparatus corresponding to the multimedia resource playing method shown in FIG. 2. A specific implementation process of the multimedia resource playing apparatus is similar to that of the method shown in FIG. 2. Refer to the description of the method shown in FIG. 2. Details are not described herein again.

In this embodiment, the terminal may obtain the identifier of the playback device, and determine, based on the correspondence between the identifier and the multimedia resource category, a category of a multimedia resource to be played, to be specific, determine which category or categories of multimedia resources need to be played by the terminal. Further, after determining the category, the terminal may play the multimedia resource in the category via the playback device. When the terminal is connected to different playback devices, the terminal may play multimedia resources of different categories via the playback devices based on identifiers of the playback devices, to implement automatic playing of a multimedia resource that a user expects to hear or watch and then implement an intelligent service of the terminal.

Figure 7:
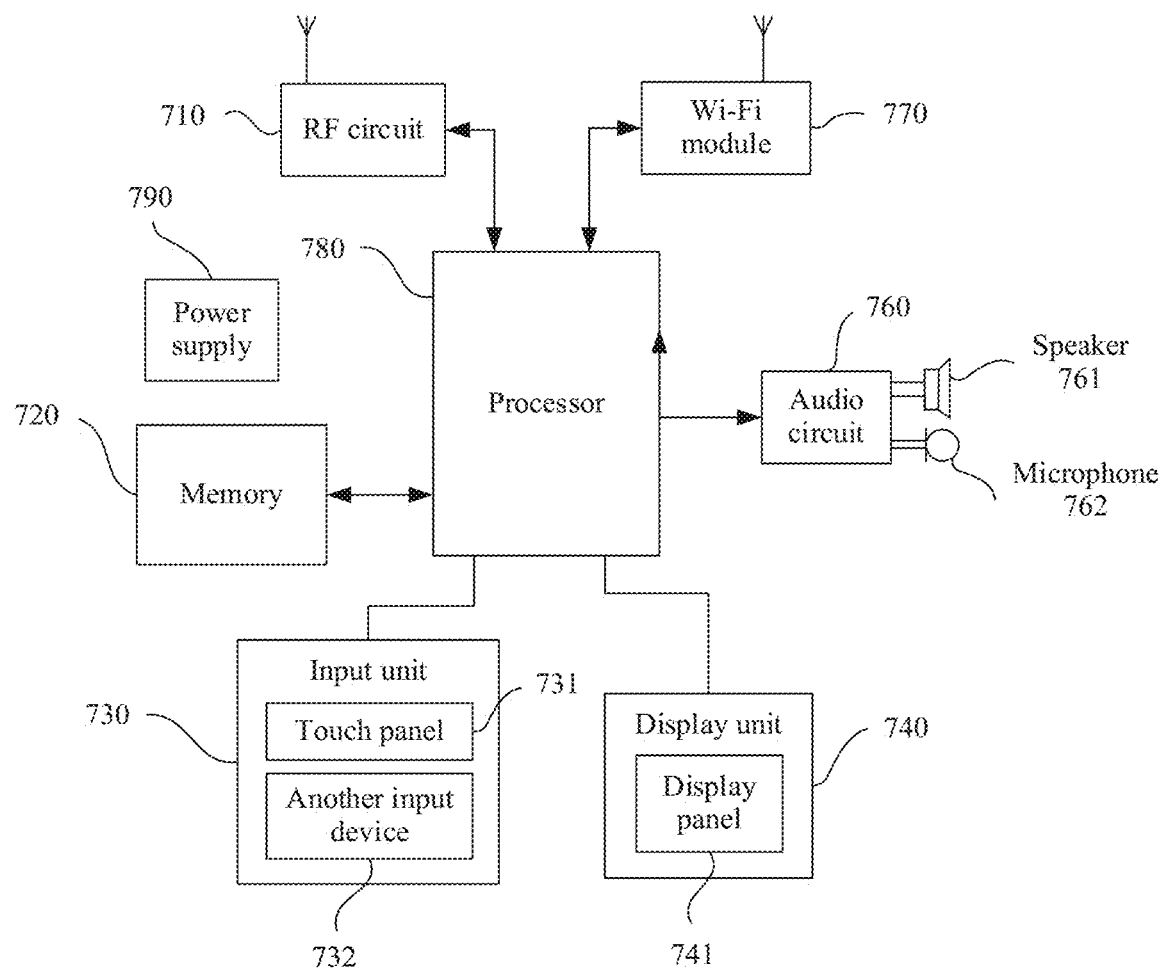
FIG. 7 is an example embodiment of a terminal according to an embodiment of this application.

The foregoing describes the terminal in this embodiment of this application from a perspective of function modularization, and the following describes the terminal in this embodiment of this application from a perspective of hardware entity processing. The terminal in this embodiment of this application may include an ARM architecture-based device, for example, a mobile phone, a tablet computer, or a personal digital assistant (PDA). For example, the terminal is a mobile phone. Refer to FIG. 7, an example embodiment of the terminal in this embodiment of this application, the terminal includes: components such as a radio frequency (Radio Frequency, RF) circuit 710, a memory 720, an input unit 730, a display unit 740, an audio circuit 760, a wireless fidelity (wireless fidelity, Wi-Fi) module 770, a processor 780, and a power supply 780. A person skilled in the art may understand that a structure of the mobile phone shown in FIG. 7 does not constitute a limitation on the mobile phone, and the mobile phone may include more or fewer components than those shown in the figure, or combine some components, or have a different component arrangement.

Each component of the mobile phone is specifically described below with reference to FIG. 7.

The RF circuit 710 may be configured to receive and send a signal in an information receiving and sending process or a call process. Particularly, after receiving downlink information from a base station, the RF circuit 710 sends the downlink information to the processor 780 for processing, and sends related uplink data to the base station. Usually, the RF circuit 710 includes but is not limited to an antenna, at least one amplifier, a transceiver, a coupler, a low noise amplifier (Low Noise Amplifier, LNA), a duplexer, and the like. In addition, the RF circuit 710 may further communicate with a network and another device through wireless communication. Any communications standard or protocol may be used for the wireless communication, including but not limited to a Global System for Mobile Communications (GSM), a General Packet Radio Service (GPRS), code-division multiple access (CDMA), wideband CDMA (WCDMA), Long-Term Evolution (LTE), an email, a short messaging service (SMS), and the like.

The memory 720 may be configured to store a software program and a module. The processor 780 runs the software program and the module stored in the memory 720 to perform various function applications of the mobile phone and data processing. The memory 720 may mainly include a program storage area and a data storage area. The program storage area may store an operating system, an application required by at least one function (such as a sound playing function and an image playing function), and the like. The data storage area may store data (such as audio data and a phone book) created based on use of the mobile phone, and the like. In addition, the memory 720 may include a high-speed random access memory, and may further include a nonvolatile memory, for example, at least one magnetic disk storage device, a flash storage device, or another volatile solid-state storage device.

The input unit 730 may be configured to receive entered digit or character information, and generate key signal input related to user setting and function control of the mobile phone. Specifically, the input unit 730 may include a touch panel 731 and another input device 732. The touch panel 731, also referred to as a touchscreen, may collect a touch operation (for example, an operation performed by the user on or near the touch panel 731 by using any proper object or accessory, for example, a finger or a stylus) performed by the user on or near the touch panel 731, and drive a corresponding connection apparatus based on a preset program. Optionally, the touch panel 731 may include two parts: a touch detection apparatus and a touch controller. The touch detection apparatus detects a touch direction of the user, detects a signal brought by the touch operation, and transfers the signal to the touch controller. The touch controller receives touch information from the touch detection apparatus, converts the touch information into coordinates of a touch point, and sends the coordinates to the processor 780. In addition, the touch controller can receive and execute a command sent by the processor 780. In addition, the touch panel 731 may be implemented by using a plurality of types such as a resistive type, a capacitive type, an infrared ray, and a surface acoustic wave. The input unit 730 may include the another input device 732 in addition to the touch panel 731. Specifically, the another input device 732 may include but is not limited to one or more of a physical keyboard, a function button (for example, a volume control button or a power button), a trackball, a mouse, a joystick, and the like.

The display unit 740 may be configured to display information entered by the user or information provided for the user, and various menus of the mobile phone. The display unit 740 may include a display panel 741. Optionally, the display panel 741 may be configured in a form of a liquid crystal display (Liquid Crystal Display, LCD), an organic light-emitting diode (Organic Light-Emitting Diode, OLED), or the like. Further, the touch panel 731 may cover the display panel 741. When detecting the touch operation on or near the touch panel 731, the touch panel 731 transmits the touch operation to the processor 780 to determine a type of a touch event, and then the processor 780 provides corresponding visual output on the display panel 741 based on the type of the touch event. In FIG. 7, the touch panel 731 and the display panel 741 are used as two independent components to implement input and output functions of the mobile phone. However, in some embodiments, the touch panel 731 and the display panel 741 may be integrated to implement the input and output functions of the mobile phone.

The audio circuit 760, a speaker 761 and a microphone 762 may provide an audio interface between the user and the mobile phone. The audio circuit 760 may transmit an electric signal converted from received audio data to the speaker 761, and the speaker 761 converts the electric signal to a sound signal for output. On the other hand, the microphone 762 converts a collected sound signal to the electric signal. The audio circuit 760 receives the electric signal, converts the electric signal into audio data, and output the audio data to the processor 780 for processing. The audio data is sent to, for example, another mobile phone, through the RF circuit 710, or the audio data is output to the memory 720 for further processing.

Wi-Fi is a short-distance wireless transmission technology. With the Wi-Fi module 770, the mobile phone may help the user send and receive emails, browse a web page, access streaming media, and the like. The Wi-Fi module 770 provides wireless access to a broadband internet for the user. Although FIG. 7 shows the Wi-Fi module 770, it can be understood that the Wi-Fi module is not a necessary constituent of the mobile phone and may be omitted as required provided that the essence of the present invention is not changed.

The processor 780 is a control center of the mobile phone, and connects all parts of the entire mobile phone by using various interfaces and lines. By running or executing the software program and/or the module stored in the memory 720 and invoking data stored in the memory 720, the processor 780 performs various functions of the mobile phone and data processing, to perform overall monitoring on the mobile phone. Optionally, the processor 780 may include one or more processing units. Preferably, an application processor and a modem processor may be integrated into the processor 780. The application processor mainly processes the operating system, a user interface, an application, or the like. The modem processor mainly processes wireless communication. It should be understood that, the modem processor may alternatively not be integrated in the processor 780.

The mobile phone further includes the power supply 780 (for example, a battery) for supplying power to the components. Preferably, the power supply may be logically connected to the processor 780 by using a power management system, to implement functions such as charging, discharging and power consumption management by using the power management system.

The mobile phone may further include a camera, a Bluetooth module, and the like, which are not shown though. The Bluetooth module on the mobile phone may be connected, through Bluetooth, to some playback devices that also have a Bluetooth module, to implement communication between the mobile phone and the playback devices.

In this embodiment of this application, when program code stored in the memory 720 is run by the processor 780, the mobile phone is enabled to perform at least the following steps:

obtaining an identifier of a playback device;

determining a multimedia resource category based on a correspondence between the identifier and the multimedia resource category; and playing a multimedia resource corresponding to the category via the playback device.

In some possible implementations, when the program code stored in the memory 720 is run by the processor 780, the mobile phone is enabled to specifically perform the following steps:

determining a scenario based on a correspondence between the identifier and the scenario; and determining the category based on a correspondence between the scenario and the multimedia resource category.

In some possible implementations, when the program code stored in the memory 720 is run by the processor 780, the mobile phone is enabled to further perform the following step:

establishing the correspondence between the identifier and the scenario in response to a scenario input operation on the terminal.

In some possible implementations, the identifier is used to uniquely identify the playback device.

In some possible implementations, the identifier of the playback device is specifically any one or more of a media access control address and a product serial number of the playback device.

In some possible implementations, a first identifier is used to represent a type of the playback device.

In some possible implementations, when the program code stored in the memory 720 is run by the processor 780, the mobile phone is enabled to specifically perform the following steps:

determining based on a correspondence between the identifier, a multimedia resource category affecting factor, and the multimedia resource category, a category corresponding to the identifier and the category affecting factor.

The category affecting factor includes any one or more of time, a location of the terminal, weather, and an environment.

In some possible implementations, when the program code stored in the memory 720 is run by the processor 780, the mobile phone is enabled to further perform the following step:

when the terminal determines to disconnect from the playback device, recording an identifier of the multimedia resource and playing progress of the multimedia resource.

In some possible implementations, when the program code stored in the memory 720 is run by the processor 780, the mobile phone is enabled to further perform the following step:

when the terminal determines to reconnect to the playback device, querying the playing progress of the multimedia resource based on the identifier of the multimedia resource, and resuming playing the multimedia resource via the playback device based on the playing progress of the multimedia resource.

In some possible implementations, when the program code stored in the memory 720 is run by the processor 780, the mobile phone is enabled to further perform the following step:

updating the multimedia resource corresponding to the category.

In some possible implementations, when the program code stored in the memory 720 is run by the processor 780, the mobile phone is enabled to further perform the following step:

obtaining the identifier of the playback device based on a digital signal provided by a conversion device, where the conversion device is separately connected to the terminal and the playback device.

In some possible implementations, when the program code stored in the memory 720 is run by the processor 780, the mobile phone is enabled to specifically perform the following steps:

reading the multimedia resource corresponding to the category from a locally stored multimedia resource library, and playing the multimedia resource via the playback device.

In some possible implementations, when the program code stored in the memory 720 is run by the processor 780, the mobile phone is enabled to specifically perform the following steps:

downloading the multimedia resource corresponding to the category from the server; and playing the multimedia resource via the playback device.

In addition, an embodiment of this application further provides a multimedia resource playing system. The system includes a playback device and a terminal. The terminal is configured to perform the multimedia resource playing method in the embodiment shown in FIG. 2, and the playback device is configured to play a multimedia resource.

In addition, an embodiment of this application further provides a computer program product including instructions. When the computer program product is run on a computer or a processor, the computer or the processor is enabled to perform a multimedia resource playing method in the embodiment shown in FIG. 2.

The word "first" in the names such as the "first application" and the "first playing unit" mentioned in the embodiments of this application is merely used as a name identifier, and does not represent first in sequence. This rule is also applicable to "second" and the like.

It can be learned from the foregoing descriptions of the implementations that, a person skilled in the art may clearly understand that all or some steps of the methods in the foregoing embodiments may be implemented by software and a universal hardware platform. Based on such an understanding, the technical solutions of this application may be implemented in a form of a software product. The computer software product may be stored in a storage medium, for example, a read-only memory (English: read-only memory, ROM)/RAM, a magnetic disk, or an optical disc, and include several instructions for instructing a computer device (which may be a personal computer, a server, or a network communications device, for example, a router) to perform the methods described in the embodiments or some parts of the embodiments of this application.

The embodiments in this specification are all described in a progressive manner, for same or similar parts in the embodiments, refer to these embodiments, and each embodiment focuses on a difference from other embodiments. Especially, apparatus and system embodiments are basically similar to a method embodiment, and therefore are described briefly. For related parts, refer to partial descriptions in the method embodiment. The described apparatus embodiment is merely an example. The modules described as separate parts may or may not be physically separate, and parts displayed as modules may or may not be physical modules, and may be located in one position, or may be distributed on a plurality of network units. Some or all of the modules may be selected according to an actual requirement to achieve the objectives of the solutions of the embodiments. A person of ordinary skill in the art may understand and implement the embodiments without creative efforts.

The foregoing descriptions are merely example implementations of this application, but are not intended to limit the protection scope of this application.

What is claimed is:

1. A multimedia resource playing method implemented by a terminal, wherein the multimedia resource playing method comprises:

obtaining a first identifier of a playback device;

determining a multimedia resource category based on a first correspondence between the first identifier and the multimedia resource category, wherein the multimedia resource category comprises at least one of an audio, a video, or an image;

playing, via the playback device, a multimedia resource corresponding to the multimedia resource category; and determining, based on a second correspondence between the first identifier, a multimedia resource category affecting factor, and the multimedia resource category, a category corresponding to the first identifier and the multimedia resource category affecting factor, wherein the multimedia resource category affecting factor comprises one or more of a time, a location of the terminal, weather, or an environment.

2. The multimedia resource playing method of claim 1, further comprising:

determining a scenario based on a second correspondence between the first identifier and the scenario, wherein the playback device is associated with the scenario; and determining the multimedia resource category based on a third correspondence between the scenario and the multimedia resource category.

3. The multimedia resource playing method of claim 2, further comprising:

receiving a scenario input operation on the terminal; and establishing, in response to the scenario input operation, the second correspondence.

4. The multimedia resource playing method of claim 1, wherein the first identifier uniquely identifies the playback device.

5. The multimedia resource playing method of claim 4, wherein the first identifier comprises a media access control (MAC) address of the playback device or a product serial number of the playback device.

6. The multimedia resource playing method of claim 1, wherein the first identifier represents a type of the playback device.

7. The multimedia resource playing method of claim 1, further comprising:

determining to disconnect from the playback device; and recording, in response to determining to disconnect from the playback device, a second identifier of the multimedia resource and playing progress of the multimedia resource.

8. The multimedia resource playing method according of claim 7, further comprising:

determining to reconnect to the playback device, querying the playing progress based on the second identifier; and resuming playing the multimedia resource via the playback device based on the playing progress.

9. The multimedia resource playing method of claim 1, further comprising updating the multimedia resource corresponding to the multimedia resource category.

10. The multimedia resource playing method of claim 1, further comprising obtaining the first identifier based on a digital signal from a conversion device.

11. The multimedia resource playing method of claim 1, wherein before playing the multimedia resource, the multimedia resource paying method further comprises reading the multimedia resource corresponding to the multimedia resource category from a locally stored multimedia resource library.

12. The multimedia resource playing method of claim 1, wherein before playing the multimedia resource, the multimedia resource playing method further comprises downloading the multimedia resource corresponding to the multimedia resource category from a server.

13. A multimedia resource playing apparatus used in a terminal, wherein the multimedia resource playing apparatus comprises:
   a memory configured to store instructions; and
   a processor coupled to the memory, wherein the instructions cause the processor to be configured to:
      obtain a first identifier of a playback device;
      determine a multimedia resource category based on a first correspondence between the first identifier and the multimedia resource category, wherein the multimedia resource category comprises at least one of an audio, a video, or an image;
      play a multimedia resource corresponding to the multimedia resource category via the playback device; and
      determine, based on a second correspondence between the first identifier,
   a multimedia resource category affecting factor, and the multimedia resource category, a category corresponding to the first identifier and the multimedia resource category affecting factor, wherein the multimedia resource category affecting factor comprises one or more of a time, a location of the terminal, weather, or an environment.

14. The multimedia resource playing apparatus of claim 13, wherein the instructions cause the processor to be further configured to update the multimedia resource corresponding to the multimedia resource category.

15. A computer program product comprising computer-executable instructions stored on a non-transitory computer-readable medium that, executed by a processor, cause an apparatus to:
   obtain a first identifier of a playback device;
   determine a multimedia resource category based on a first correspondence between the first identifier and the multimedia resource category, wherein the multimedia resource category comprises at least one of an audio, a video, or an image;
   play, via the playback device, a multimedia resource corresponding to the multimedia resource category; and
   determine, based on a second correspondence between the first identifier, a multimedia resource category affecting factor, and the multimedia resource category, a category corresponding to the first identifier and the multimedia resource category affecting factor, wherein the multimedia resource category affecting factor comprises one or more of a time, a location of the terminal, weather, or an environment.

16. The computer program product of claim 15, wherein the computer-executable instructions further cause the apparatus to:
   determining a scenario based on a second correspondence between the first identifier and the scenario, wherein the playback device is associated with the scenario; and
   determining the multimedia resource category based on a third correspondence between the scenario and the multimedia resource category.

17. The computer program product of claim 16, wherein the computer-executable instructions further cause the apparatus to:
   receive a scenario input operation on the terminal; and
   establish, in response to the scenario input operation, the second correspondence.

18. The computer program product of claim 15, wherein the first identifier uniquely identifies the playback device.

19. The computer program product of claim 18, wherein the first identifier comprises a media access control address of the playback device or a product serial number of the playback device.

* * * * *